ized Patent [19]

United States Patent [19]
Burgess

[11] Patent Number: 4,952,344
[45] Date of Patent: Aug. 28, 1990

[54] METHOD OF AND APPARATUS FOR MAKING A FISHING LINE

[75] Inventor: Paul D. Burgess, Brecon, Great Britain

[73] Assignee: Fly Fishing Technology Limited, Brecon, United Kingdom

[21] Appl. No.: 298,885

[22] PCT Filed: Jul. 13, 1987

[86] PCT No.: PCT/GB87/00491
§ 371 Date: Mar. 13, 1989
§ 102(e) Date: Mar. 13, 1989

[87] PCT Pub. No.: WO88/00521
PCT Pub. Date: Jan. 28, 1988

[30] Foreign Application Priority Data

Jul. 12, 1986 [GB] United Kingdom ............ 8617017
Jul. 19, 1986 [GB] United Kingdom ............ 8617689
Sep. 26, 1986 [GB] United Kingdom ............ 8623200

[51] Int. Cl.$^5$ .................. B29C 47/02; B29C 47/92
[52] U.S. Cl. ........................... 264/40.1; 264/40.5;
264/40.6; 264/40.7; 264/45.9; 264/49; 264/167;
264/174; 264/177.17; 264/177.2; 264/211;
264/211.13; 264/237; 425/71; 425/113;
425/135; 425/141; 425/143; 425/145; 425/325;
425/377; 425/378.1; 425/817 C

[58] Field of Search ............ 264/40.1, 40.5, 40.6,
264/40.7, 45.9, 49, 167, 174, 177.1, 177.17,
177.2, 211, 211.13, 211.14, 237, 348; 425/71,
113, 135, 143, 145, 325, 378.1, 392, 141, 817 C,
377

[56] References Cited

U.S. PATENT DOCUMENTS

| 3,280,847 | 10/1966 | Chisholm et al. ............... 425/113 X |
| 3,624,025 | 11/1971 | Twist ............................ 264/174 X |
| 3,646,186 | 2/1972 | Hager ............................ 264/174 |
| 3,674,404 | 7/1972 | Burlis et al. ................... 425/145 X |
| 3,773,449 | 11/1973 | Hager ............................ 425/114 |
| 3,830,009 | 8/1974 | Collingbourne ............... 43/44.98 |
| 3,868,785 | 3/1975 | Foote ............................ 43/44.98 |
| 3,928,519 | 12/1975 | Kashiyama et al. ............ 264/40.7 |
| 4,257,991 | 3/1981 | Kirjavainen .................... 264/40.6 |
| 4,354,989 | 10/1982 | Beach ............................ 264/40.6 |
| 4,585,603 | 4/1986 | Furuta et al. .................. 264/40.6 |
| 4,592,881 | 6/1986 | Kyriakis ........................ 264/40.1 |
| 4,605,525 | 8/1986 | Baxter ........................... 264/40.5 |
| 4,719,808 | 1/1988 | Baumann et al. ........... 264/40.1 X |
| 4,744,930 | 5/1988 | Twist et al. ................. 264/40.1 X |

FOREIGN PATENT DOCUMENTS

| 89060 | 9/1983 | European Pat. Off. . |
| 1917155 | 8/1970 | Fed. Rep. of Germany . |
| 2845987 | 3/1980 | Fed. Rep. of Germany . |
| 2101991 | 3/1972 | France . |
| 2194557 | 3/1974 | France . |
| 74639 | 7/1970 | German Democratic Rep. .................... 425/141 |
| 244486 | 4/1987 | German Democratic Rep. .................... 264/40.7 |
| 59-94309 | 5/1984 | Japan ........................ 264/40.1 |
| 60-72113 | 4/1985 | Japan ........................ 264/40.7 |
| 1211963 | 11/1970 | United Kingdom . |
| 2130763 | 6/1984 | United Kingdom . |

OTHER PUBLICATIONS

English-Language Translation of DE-OS 2,845,987.

Primary Examiner—Jeffery Thurlow
Assistant Examiner—Leo B. Tentoni
Attorney, Agent, or Firm—Young & Thompson

[57] ABSTRACT

A fishing line, or just a leader, has a core (11) which is coated by plastic material as it is pulled through an extruder (3) and then a quench bath (4) by a variable speed drive device (9). Very fine control can be exerted by laser devices (11, 12) before and after coating, and adjusting a selection of parameters such as drive speed, extrusion rate, pressure and temperature, and cooling. A double coating may be applied or additives mixed in the extruded plastics which will give a desired floating or sinking characteristic.

10 Claims, 2 Drawing Sheets

4,952,344

METHOD OF AND APPARATUS FOR MAKING A FISHING LINE

This invention relates to fishing lines, and in particular to fly lines.

BACKGROUND OF THE INVENTION

Modern plastic fly lines now account for practically all fly line sales. They generally consist of a polyvinylchloride (PVC) coating over a uniform nylon core. The coating is usually tapered and is the controlling factor for line density and weight. Some fly lines are made to float, others are made to neutral density and yet others are made to sink at various rates. The floating fly lines generally use minute hollow glass balls mixed with the PVC, the balls making up about 30% of the coating. The PVC normally has a natural density of about 1.2 to 1.25, while that of the glass balls is about 0.3. The sinking lines use various fillers, such as solid glass balls or pulverised lead.

This construction has a number of disadvantages. PVC is naturally a rigid material and plasticisers are added to make it supple. However, these slowly leach out and the PVC gradually returns to its rigid state, with the result that the fly lines crack and fall apart. Also, the glass balls make the fly lines stiffer than they would be without them, which results in more work being done to bend them, leaving less energy to project them when casting The process of manufacture is fairly crude and it is often impossible to predict the weight of a line being made and so keep it to specification. Many lines are made and then classified. Another drawback is that the surface of the line is not smooth; it has many indentations caused by the glass balls, and it is less durable because of the fillers.

The disadvantages are well recognised in existing patents. For example, British Pat. Nos. 1,399,995 and 1,438,918 mention them and try to overcome them. However, all these attempts are along one path and basically work with the original concept and attempt to mitigate the inherent disadvantages.

All fly lines are sold to an AFTM weight standard. This is based upon the weight of the first 30 feet of the line excluding the two foot or so level tip. Typically the AFTM weights are expressed in numbers in the range 1 to 12. Each number has a weight range acceptable to it expressed in grains. For example

| AFTM NO. | RANGE IN GRAINS | GMS. |
| --- | --- | --- |
| 5 | 134–146 | 8.68–9.46 |
| 6 | 156–168 | 10.10–10.88 |
| 7 | 177–193 | 11.46–12.50 |

It is extremely difficult to perform adequately to this standard. The customer nevers finds out because he has to cut off 30 feet to discover it! This also makes it difficult for manufacturers, and the common practice is to guess the weight.

To see why the standard is not kept to, consider the difference in grams between AFTM 5 and 6. it is just 0.647989 gms. over 30 feet of line or just 0.0216 gms. per foot on average. With a line having an SG of 1, say, this works out to a tolerance of 0.000709 gms. per centimeter run, correspondinq to a dimensional tolerance of 10 mm. Clearly such tolerances are very difficult to achieve by running the line at constant speed as it is coated through a variable orifice or die. The variables such as room temperature, changing mix of glass balls, and varying viscosities make it impossible by normal methods.

Another advantageous requirement is for the line to taper and in particular to have a 'belly' over the middle portion and to reduce smoothly towards the ends. As a further refinement, to be discussed in more detail later, varying the density along the line to a predetermined pattern can also considerably enhance performance.

SUMMARY OF THE INVENTION

According to one aspect of the present invention there is provided a method of manufacturing fishing line comprising continuously drawing a linear core from a supply by means of variable speed drive means, extruding a plastics coating over said core upstream of said drive means and governing the profile of the line by variation of at least one of the following parameters:

(i) The speed of said drive means,
(ii) The extrusion rate,
(iii) The extrusion pressure,
(iv) The extrusion temperature, and
(v) The cooling of the coated line between the extruder and the drive means.

According to another aspect of the present invention there is provided apparatus for manufacturing fishing line comprising supply means for a linear core, a plastics extruder, variable speed drive means for drawing the core from the supply means through the extruder which, in operation, applies a plastics coating over the core, and means for governing the profile of the line by variation of at least one of the following parameters:

(i) The speed of said drive means,
(ii) The extrusion rate,
(iii) The extrusion pressure,
(iv) The extrusion temperature, and
(v) The cooling of the coated line between the extruder and the drive means.

With a multi-filament core, suction may be applied to it upstream of the extruder to draw the plastics material into interstices in the core. The variable parameters can then include the degree of suction applied.

The thickness of the line will normally be continuously monitored upstream and/or downstream of the extruder and the information ascertained can then be used to regulate at least one of the variable parameters. Laser devices are most suitable for this.

Cooling will generally be effected primarily by a quench bath through which the coated line is drawn. The cooling variations can include adjustment of one or more of:

(i) The distance between the extruder and the bath,
(ii) The length of the bath, and
(iii) The temperature of the quench liquid.

More than one coating can be applied, possibly by providing a further extruder downstream of the first, and each coating may have different properties. By correlating dimensions and densities, a line can be obtained which will float or sink in a predetermined manner.

An alternative buoyancy control is achievable by mixing with the extruded plastics material a particulate material, such as sodium bicarbonate, which when subjected to heat in the extruder, vaporises to create voids in the coating. Adding PTFE as well is advantageous here.

All this profile governing will be computer controlled. It can be continuously fed with information on selected parameters, preferably all of them, and current thickness, and by reference to what the profile is programmed to be, make adjustments to those parameters, the speed control being the one to produce the most instantaneous response.

BRIEF DESCRIPTION OF THE DRAWINGS

For a better understanding of the invention, some embodiments will now be described, by way of example, with reference to the accompanying drawings, in which.

DETAILED DISCUSSION

Figure 1:
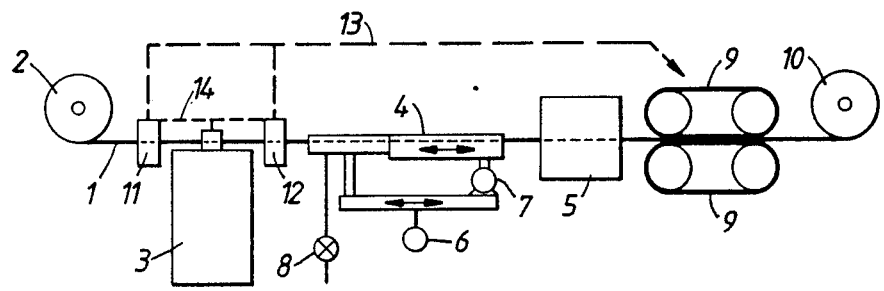
FIG. 1 is a diagram of apparatus for coating lines.

In FIG. 1, a line 1 to be coated is led off a reel 2 through a cross-head extruder 3. In practice, the extruder has the usual screw section, and downstream of this there is a pump which forces the material into the die described below. Both screw and pump will be subject individually to computer control, but for convenience they will be collectively referred to as the extruder 3. Another feature is that the extruder die has a fixed orifice, even though the final line will vary in diameter. Expansion of the coating after leaving the die can be accurately controlled as described below.

As mentioned above, normal extrusion has a problem with control of the AFTM weight. In practice the amount extruded will vary with time, no matter how closely one monitors the temperatures, screw speed and so on. Each batch of chemicals is slightly different and that is only one of a long list of factors.

As a first measure, therefore, the extruder 3 and other devices to be described are put under total computer control, governing all temperatures, extruder screw speed and pressure, treatment distances, the haul-off speed throughout and at the beginning when speeding up and at the end when slowing down, and vacuum. The computer will be programmed to produce fly lines of particular dimensional and weight distribution profiles.

With regard to vacuum, suction may be applied to the exposed line immediately upstream of the extruder 3, particularly with braided line, and this will draw the plastics material into the interstices to an extent depending on the negative pressure imposed, thus providing means for varying the line density. The coating is firmly keyed to the braid, this being a particular advantage in fly lines where, previously, coatings have tended to peel away from the central core. However, it will tend to leave a dimpled surface, which is not favoured, although it can be "ironed out" by subsequent rollers, heat treatment, or by applying a further coating, as described later, in a second run.

The line 1 emerges from the extruder 3 with a coating of plastics material which is hot and still fluid or at least tacky. Its surface may not be as smooth as is now demanded, and to improve this it may pass through a heat flash device (not shown), such as a small gas ring or a hot air blower, immediately before entering a cooling bath 4 and thence passing to a dryer 5.

The distance the coated line travels before entering the bath 4 is a factor affecting the eventual density and size of the line and so offers a means of control. Thus the bath 4 is capable of longitudinal adjustment by a motor 6 under computer control. It is also possible to have the bath itself extendible and retractable by a further computer-governed motor 7, exerting a further control.

Yet another factor affecting the final properties of the line is the temperature of the quench liquid, which will normally be water at ambient temperature. However, this can be varied (although not with the same immediate response as with speeds and distances) by injection of gases or liquids at substantially lower temperatures, as indicated by the line with a computer-controlled valve 8.

Downstream of the dryer 5 there are opposed haul-off belts 9 which nip the coated line and pull it through the devices upstream and off the reel 2. It is the speed of these belts which determine the speed through the cross-head extruder 3.

The process of changing diameter by haul-off, with proper motor control, is very exact indeed and given that there is a reasonably stable extrusion rate, it is capable of producing lines to the 10 mm tolerance over the required length. It takes time to change the extrusion rate; it is a matter of minutes before it comes into equilibrium. However, haul-off speed can be changed in a fraction of a second and to achieve this a laser diameter reading device 11, capable of measuring variations in the diameter of the moving fly line of the order of 10 mm, is arranged upstream of the extruder 3, and a similar one 12 downstream. The latter may have to operate through the bath 4. Their responses govern the haul-off speed with the required precision and rapidity through the computer, as indicated by the broken line 13. In addition, the laser devices can exert control over the extruder screw, as indicated by the dotted line 14.

It is possible that just one such laser device would suffice. For example, with a reliably uniform core the device 11 might be redundant, and with a very steady extruder the device 12 might be omitted. However, with tapered cores, the upstream device is important.

To achieve the required characteristics may require two differently tapered coatings, one on top of the other, and it may even be possible and desirable to apply three coatings. In order to do this the line with its first tapered coating will be fed through again for the second tapered coating to be applied. This requires precision laser control with the laser device 11 constantly measuring the first taper and the computer controlling the haul-off based on this and other data, to which a contribution will be made by the second laser device 12.

After emerging from the belts 9, the coated line is wound on a take-up spool 10. However, it may be severed into separate fly lines immediately downstream of the belts. But if it is wound, as soon as possible after the run is completed, it is unwound and cut to lengths; and in either case the lengths are held under slight tension for up to 48 hours. This memorises each of them into a straight line, aids turnover and casting considerably, and leads to less tangles.

If this is not done at the time of manufacture, it may be done at a later stage by simply heating the lines to a temperature of about 100° C. in a hot air or microwave tunnel and then allowing to cool for the required period.

For starting up the process the core of the line is rove through the extruder 3 and subsequent treatment devices to the haul-off means 9 and the take-up spool 10, and the plastics material for the coating is charged into the hopper for the extruder. The computer controls all subsequent stages:

1. All parts of the machinery are heated to target temperatures.

2. A calibration speed is set and a calibration section is started, based on a target speed of the extruder screw.

3. The laser device 12 monitors the calibration section, measuring in two dimensions to calculate not only diameter but volume and ovality.

4. The laser device 12 adjusts the screw speed of the extruder 3 and monitors it until the screw speed is stable and giving the calibration required, based upon a fixed haul-off speed.

5. A run into the tip of the first fly line is started, monitored by the laser device 12 until the required diameter is reached and is stable.

6. Fly line manufacture begins, cycling continuously.

7. For a given fly line size/type there are calibration sections laid down at fixed points in the cycle, for example the tip and the belly. The laser readings of the fly lines are used by the computer both to set a new target screw speed but still compensate in the short term for variance by using haul-off speed.

The result of this process is that all lines are constantly recalibrating the machine, and yet it also ensures that they are still made within tolerance.

The normal fly line uses PVC which has many inherent drawbacks, as mentioned earlier. The core of our fly lines could be braided nylon or polyester, tapered or uniform. However, we will often prefer the material known as "KEVLAR" (aramid fiber). The advantages of this are that a very small amount suffices, it is of high tensile strength, it is flexible, and it reduces the elasticity of the line. It does all this without interfering with the floating/sinking characteristics of the line, and it also gives a much smoother surface. Generally, it need not be braided; the filaments can simply be twisted together.

The plastics coating used over the core is selected depending on the floating/sinking characteristics of the line. However, polyurethane is much preferred for fly lines. The material has tremendous wearing properties, being many times more abrasive resistant than steel, and it can be made very flexible with a low hysteresis loss. Energy transfer is thereby aided. It is also tear resistant and more chemical resistant than PVC. The density of the material varies between 1.14 and 1.18 depending on which base it is made with, and so it is highly suitable for sinking lines. In order to make it heavier there are many commercial fillers such as pulverised lead, barium sulphate or tungsten which can be added to it to increase its density up to an SG of 2 or more.

A floating line still requires the properties of polyurethane but not the weight. This can be achieved by using various polymer mixtures, usually based upon polyethylene and polypropylene or even mixtures of both. The resultant plastics material has an SG of about 0.9. However, whilst still being an improvement on PVC it is not in the same class as polyurethane. Therefore after the core is coated with the light polymer a second coating of polyurethane is applied, giving an overall SG of about 0.95 or thereabouts. The second coating may be applied in three ways:

1. By passing the fly line through a solution of polyurethane and drying off the solvent.

2. By a repeat run, extruding a coating of polyurethane over the first coating of a fly line. This second coating may vary with time to give a taper, or augment one already existing.

3. By fitting a secondary small extruder on line which will give the second coating in one pass, although a coolant reservoir may then be needed in between so that the second extrusion is made onto a firm base.

However, a preferred technique is to mix the plastics material as it is delivered to the extruder with a material, conveniently in fine powder form, which will vaporise when subjected to the heat and pressure within the extruder and form minute bubbles within the coating, giving buoyancy. Sodium bicarbonate is suitable, and when heated generates carbon dioxide which forms voids in the plastic. During the extrusion process the temperature gradients and pressures are controlled so that the output of polymer over the core has a specific gravity of a known value. The variable that controls this is the amount of carbon dioxide being formed inside the polymer and a major factor determining this is the temperature gradient during extrusion and the final temperature of the extrudant. The higher the temperature the lower the specific gravity. But in addition the voids are compressed by holding the polymer under pressure until it leaves the die and enters the atmosphere. Once it has entered the atmosphere the gas will continue to expand until it is held by the gradually cooling polymer.

To improve this technique, PTFE in fine powder form may be included in the mix. This acts as a nucleating agent for the bubbles, enabling them to be very small and well distributed, and it also reduces friction and improves waterproofing.

Figure 2A:
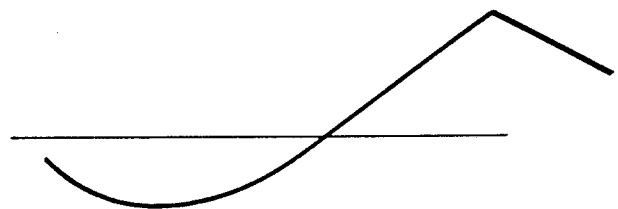
FIG. 2 shows diagrams of sinking characteristics.
Figure 2B:
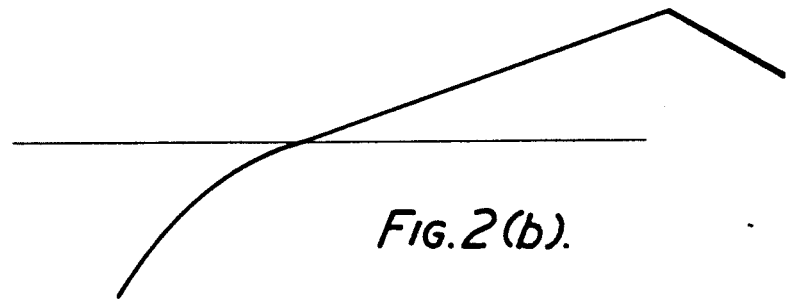
Figure 2:
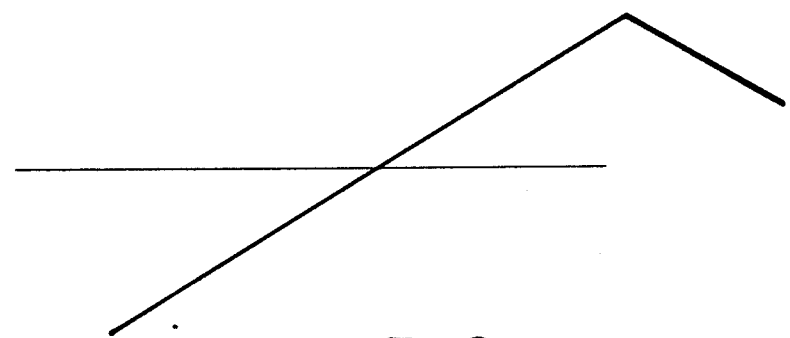

The multi-coating techniques referred to above can also be applied to sinking lines. The sinking rate of a line in a given medium is dependent upon two main factors, the density and the diameter. This means that fly lines of even density but with tapered tips have the tips sink at a slower rate than the belly, as shown in FIG. 2(a). Another problem is with lines known as "sink tips". These are floating lines which have a tip section which sinks, with an abrupt change of material at the junction. The normal length of this tip section varies from 3 to 10 meters and it generally sinks fast dragging the floating section underneath with it. This forms a very convex sinking profile as shown in FIG. 2(b), and the sudden density change leads to casting difficulty.

These problems can be overcome by applying two or more coatings of different density polyurethanes. All layers are tapered and the end product has a varying density along the line, calculated with the diameter being taken into account to give a much straighter sinking profile, as shown in FIG. 2(c). But again, it will generally be preferred to achieve the same effect by using the bubble technique described above in a single coating, the voids being more infrequent than in a floating line.

To be able to change the density of a line along its length has many advantages. For example, with some heavy cores such as nylon the tips of lines sink because the ratio of core to coating is high. By creating a lower density line at the tip this can be compensated for. Another advantage is that varying the density along a sinking line to give the required sinking profile means much better contact with the fish. Also sink tips may be made which are easier to cast and yet still have a fairly straight sinking profile. Conversely, floating tips may be made on sinking lines.

Another major advantage is the avoidance of line wake when the line is drawn through the water. For example, a floating fly line with a gradually increasing density of tip to about neutral density may be made so that the end section gradually goes below the surface film, thereby avoiding line wake near the fish. The result is an anti-wake fly line that does not sink more than a few inches below the surface.

Yet another advantage of the technique is the ability to change other characteristics of the fly line along its length. For example, extra hard wearing polyurethane can be applied to the section behind the belly on a weight forward type line to give extra resistance to the flexing and wear and tear placed on this part during casting. Also, a totally different running section can be created on a weight forward type fly line which has a different stiffness and shooting property. This would help with shooting and avoid tangling.

Floating and sinking leaders may be made similarly either on level or tapered nylon core, as illustrated in FIG. 3.

Figure 3A:
FIG. 3 shows examples of sections of coated lines.

In FIG. 3(a), the line is constructed in tapered sections, for example as described in our co-pending British application No. 8615847. The laser device 11 determines with great accuracy the instantaneous thickness of the line passing it, and governs the speed of the belts 9, continuously adjusting that so that the part passing through the extruder 3 is at a particular speed which will generate a particular thickness of coating. The line is slowed as it thickens to cater for the amount of coating needed.

Figure 3B:
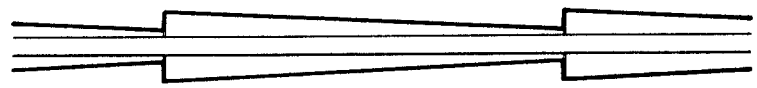

For a line such as shown in FIG. 3(b), which is of uniform thickness, the laser device 11 is not required. But the belt speed is varied in a cyclic manner gradually from high to low and then back to high with an abrupt step (or vice versa) so that a variable thickness coating is applied, this being checked by the laser device 12. The profile of this need not be in straight sections and the change of speed need not be linear.

Figure 3C:

In FIG. 3(c), there is shown a section of line with a double coating, the inner one (usually of relatively soft material) being applied in accordance with FIG. 3(b) and the outer one in accordance with FIG. 3(a).

On the take-up spool 10, there will be a continuous length of line which has to be cut up into leader lengths. The steps between sections make it easy to automate this; the line can be drawn past a detector which will sense the steps to actuate a cutting device at appropriate times downstream of the detector.

These may be regarded as much foreshortened versions of complete fly lnes, although not of the same profile. For a sinking leader, it is particularly preferred to use tungsten as the agent to promote sinking.

In a further development of coating braided line, the braid (of nylon for example) is itself loosely formed over a central core of plastics material This may be polyurethane, extruded as a monofilament. The composite line is then externally coated in the manner described above, again with polyurethane, or possibly some other plastics material. With the materials mentioned, such a line will serve particularly well as a shock absorber, often necessary when handling big fish.

With a braided core buoyancy may be provided by sealing air in the interstices, using a thin film of polyurethane. Alternatively it may be impregnated with low SG plastics such as polyethylene or polypropylene and then dipped in a solution of polyurethane to form a thin skin.

In all but the fast sinking leaders the materials used are preferably translucent.

By including various lubricants such as silicone in the polyurethane it is possible to have the line self-lubricating over a long period of time.

I claim:

1. A method of manufacturing a tapered fishing line comprising continuously drawing a linear core from a supply by variable speed haul-off means, heating thermoplastic material predominantly comprising polyurethane and extruding it as a coating over said core upstream of the haul-off means using an extruder with a variable extrusion rate, monitoring the thickness of the line provided by the coated core immediately adjacent the extruder, cooling the line between the thickness monitoring means and the haul-off means, and selectively varying the speed of the haul-off means, the rate of extrusion, the heating of the thermoplastic material and the cooling of the coated line in response to the monitored thickenss to taper the coated line according to a predetermined computer program.

2. A method according to claim 1, wherein the cooling is effected primarily by a liquid in a quench bath through which the line is drawn, and the cooling variations include at least one of:
    (i) distance between the extruder and the bath,
    (ii) length of the bath, and
    (iii) temperature of the liquid.

3. A method according to claim 1, wherein at least two coatings with different properties are applied, the outermost coating being the one predominantly comprising polyurethane.

4. A method according to claim 1, wherein the computer is programmed to correlate the densities and dimensions of the core and the coating to provide a line with a predetermined buoyancy characteristic along its length.

5. A method according to claim 1, wherein the thermoplastic material is mixed with particulate material which when subjected to heat in the extruder, vaporizes to create voids in the coating.

6. A method according to claim 1, wherein PTFE is included in the thermoplastic material.

7. Apparatus for manufacturing a tapered fishing line comprising supply means for a linear core, a thermoplastic extruder with a variable extrusion rate, means for heating thermoplastic material in the extruder, variable speed haul-off means for drawing the core from the supply means through the extruder which, in operation, applies a coating over the core, means for monitoring the thickness of the line provided by the coated core immediately adjacent the extruder, means for cooling the line between the thickness monitoring means and the haul-off means, and a computer programmed to vary through associated control means the speed of the haul-off means, the rate of extrusion, the heating of the thermoplastic material and the cooling of the coated line in response to the monitored thickness.

8. Apparatus according to claim 7, wherein the cooling means comprises a quench bath with liquid therein through which the line is drawn, the associated control means being arranged to govern at least one of:
    (i) distance between the extruder and the bath,
    (ii) length of the bath, and
    (iii) temperature of the liquid.

9. Apparatus according to claim 7, including at least one further extruder through which the core with a first coating is drawn for the formation of at least one further coating.

10. Apparatus according to claim 7, including means for adding particulates material to the thermoplastic material being extruded.

* * * * *